(12) United States Patent
Hu et al.

(10) Patent No.: US 12,548,861 B2
(45) Date of Patent: Feb. 10, 2026

(54) BATTERY CELL WITH OVERLAP BETWEEN INSULATOR AND CONNECTOR, BATTERY, AND ELECTRONIC DEVICE

(71) Applicant: Ningde Amperex Technology Limited, Fujian (CN)

(72) Inventors: Hongwei Hu, Ningde (CN); Xiulan Yuan, Ningde (CN); Jiao Tian, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 21 days.

(21) Appl. No.: 18/912,866

(22) Filed: Oct. 11, 2024

(65) Prior Publication Data
US 2025/0038367 A1    Jan. 30, 2025

Related U.S. Application Data

(63) Continuation of application No. 18/651,842, filed on May 1, 2024, which is a continuation of application No. PCT/CN2022/125482, filed on Oct. 14, 2022.

(30) Foreign Application Priority Data

Nov. 1, 2021  (CN) .................... 202122651483.X

(51) Int. Cl.
*H01M 50/531*    (2021.01)
*H01M 50/528*    (2021.01)
(Continued)

(52) U.S. Cl.
CPC ....... *H01M 50/531* (2021.01); *H01M 50/528* (2021.01); *H01M 50/586* (2021.01); *H01M 10/0431* (2013.01)

(58) Field of Classification Search
CPC ........ H01M 10/0431; H01M 10/0584; H01M 50/593; H01M 50/258; H01M 50/586;
(Continued)

(56) References Cited

U.S. PATENT DOCUMENTS

2004/0161662 A1    8/2004  Kim et al.
2010/0310912 A1*   12/2010 Kim .................. H01M 10/0587
                                                         429/94
(Continued)

FOREIGN PATENT DOCUMENTS

CN    205543092 U    8/2016
CN    110034268 A    7/2019
(Continued)

OTHER PUBLICATIONS

English Translation of JP2002-343419 (Year: 2002).*
(Continued)

*Primary Examiner* — Stephen J Yanchuk
(74) *Attorney, Agent, or Firm* — Maier & Maier, PLLC

(57) ABSTRACT

A battery cell includes a battery cell body, at least two tabs, a first connector and at least two insulators. The first connector is configured to fasten a tail end of an electrode assembly to an outer surface of the battery cell body; the at least two tabs include a first tab and a second tab, and the at least two insulators include a first insulator and a second insulator, where first ends of the first insulator and the second insulator are all provided on the battery cell body, a second end of the first insulator covers part of the first tab, and a second end of the second insulator covers part of the second tab; and in a width direction of the battery cell body,
(Continued)

the first insulator is provided close to the first connector, where at least part of the first insulator is located outside the first connector.

22 Claims, 6 Drawing Sheets

(51) Int. Cl.
*H01M 50/586* (2021.01)
*H01M 10/04* (2006.01)

(58) Field of Classification Search
CPC . H01M 50/503; H01M 50/533; H01M 50/538
See application file for complete search history.

(56) References Cited

U.S. PATENT DOCUMENTS

| | | | |
|---|---|---|---|
| 2011/0129707 A1* | 6/2011 | Ahn | H01M 10/02 429/94 |
| 2013/0260203 A1 | 10/2013 | Yoshida et al. | |
| 2015/0125732 A1* | 5/2015 | Ohta | H01M 10/0525 429/130 |
| 2016/0380299 A1* | 12/2016 | Umeyama | H01M 10/0431 429/94 |
| 2020/0212408 A1* | 7/2020 | Zhang | H01M 50/46 |
| 2021/0226305 A1* | 7/2021 | Hu | H01M 50/538 |
| 2021/0367271 A1* | 11/2021 | Wang | H01M 50/538 |
| 2022/0021001 A1* | 1/2022 | Tamura | H01M 4/662 |

FOREIGN PATENT DOCUMENTS

| | | | |
|---|---|---|---|
| CN | 210092210 U | | 2/2020 |
| CN | 213278324 U | | 5/2021 |
| CN | 113437443 A | | 9/2021 |
| CN | 216213939 U | | 4/2022 |
| JP | 2002343419 A | * | 11/2002 |
| KR | 1020210072823 A | | 6/2021 |
| WO | 2021057632 A1 | | 4/2021 |

OTHER PUBLICATIONS

International Search Report mailed Jan. 9, 2023, in corresponding International Application No. PCT/CN2022/125482, 6 pages.
Extended Search Report issued on Jun. 11, 2025, in corresponding European Application No. 22885713.2, 8 pages.

* cited by examiner

BATTERY CELL WITH OVERLAP BETWEEN INSULATOR AND CONNECTOR, BATTERY, AND ELECTRONIC DEVICE

CROSS REFERENCE TO RELATED APPLICATION

This application is a continuation application of U.S. application Ser. No. 18/651,842, filed on May 1, 2024, which is a continuation application of International Application No. PCT/CN2022/125482, filed on Oct. 14, 2022, and entitled "BATTERY CORE, BATTERY, AND ELECTRONIC DEVICE", which claims priority to Chinese Patent Application No. 202122651483.X, filed with the China National Intellectual Property Administration on Nov. 1, 2021 and entitled "BATTERY CELL, BATTERY, AND ELECTRONIC DEVICE", the contents of which are incorporated herein by reference in their entirety.

TECHNICAL FIELD

Embodiments of this application relate to the field of battery technologies, and in particular, to a battery cell, a battery, and an electronic device.

BACKGROUND

A wound battery cell is generally terminated on a side of a battery cell body, and a connector is bonded to the tail of an electrode plate on the outermost circle of the battery cell. In addition, insulators are provided at the joint of a tab and the battery cell body.

During implementation of this application, inventors of embodiments of this application have found that when the tabs on the terminating side of the battery cell body have a small edge distance, insulating tapes on the tabs may be entirely attached to the connectors, which affects bonding force of the insulators and stability of the battery cell. In addition, since the insulators are entirely attached to the connectors, thickness of the battery cell is increased, which affects energy density of the battery cell.

SUMMARY

To resolve the foregoing technical problem, embodiments of this application provide a battery cell, a battery, and an electronic device, so as to improve stability and energy density of the battery.

Some embodiments of this application provide the following technical solution for resolving the technical problem: A battery cell is provided, where the battery cell includes a battery cell body and at least two tabs provided on the battery cell body, where the battery cell body is formed by winding an electrode assembly formed by stacking a first electrode plate and a second electrode plate, a tail end of the electrode assembly is a free end, and a separator is provided between the first electrode plate and the second electrode plate; and the battery cell further includes a first connector and at least two insulators, where the first connector is provided in a length direction of the battery cell body and is configured to fasten the tail end of the electrode assembly to an outer surface of the battery cell body, the at least two tabs include a first tab and a second tab having opposite polarities, the at least two insulators include a first insulator and a second insulator, a first end of the first insulator is provided on the battery cell body, a second end of the first insulator covers a part of the first tab, a first end of the second insulator is provided on the battery cell body, and a second end of the second insulator covers a part of the second tab.

In a width direction of the battery cell body, at least a part of the first insulator does not overlap with the first connector.

Such arrangement allows the first insulator not to be entirely attached to the first connector, avoiding upwarp of the first insulator when the battery cell is top-sealed while such upwarp affects the stability of the battery cell. Such arrangement also reduces an overlapping region of the first insulator and the first connector to some extent, thereby increasing the energy density of the battery cell.

In some embodiments, a surface of the first connector in contact with the battery cell body is provided with a binding layer.

In some embodiments, both two opposite surfaces of the first connector in a thickness direction of the battery cell body are provided with binding layers. In this way, bonding force of the insulator can be increased, and the stability of the battery cell can be improved.

In some embodiments, in the width direction of the battery cell body, the first insulator partially overlaps with the first connector. In the width direction of the battery cell body, width of the first connector decreases, which prevents the first insulator from being entirely attached to the first connector, thereby increasing the bonding force of the first insulator and improving the stability of the battery cell.

In some embodiments, a gap is provided between the first insulator and the first connector. Thus, the first insulator is entirely outside the first connector, fully avoiding the upwarp of the first insulator.

In some embodiments, in the length direction of the battery cell body, the first connector is provided with a notch, and a portion of the first insulator provided on the battery cell body is arranged in the notch. In this way, the bonding force of the insulator is increased, and the stability of the battery cell is improved. In addition, the overlapping region of the first connector and the insulator is reduced, thereby increasing the energy density of the battery cell.

In some embodiments, the battery cell further includes a third tab, where the third tab has a same polarity as the first tab, and the at least two insulators further include a third insulator, where a first end of the third insulator is provided on the battery cell body, a second end of the third insulator covers a part of the third tab, and the second tab is provided between the first tab and the third tab in the width direction of the battery cell body.

In some embodiments, the first insulator, the second insulator, and the third insulator are integrally formed. In this way, the bonding force of the insulators is increased, and the stability of the battery cell is improved.

In some embodiments, the outer surface of the battery cell body includes a first plane surface, a second plane surface, a first cambered surface, and a second cambered surface, where the first plane surface and the second plane surface are provided opposite to each other in the thickness direction of the battery cell body, the first cambered surface and the second cambered surface are provided opposite to each other in the width direction of the battery cell body, and the first cambered surface and the second cambered surface are connected between the first plane surface and the second plane surface.

In some embodiments, the tail end of the electrode assembly is located on the first cambered surface, and the first connector extends from the first plane surface to the second plane surface through the first cambered surface.

In some embodiments, the tail end of the electrode assembly is a part of the first electrode plate or a part of the separator, and the first connector covers the entire second electrode plate in the length direction of the battery cell body. Thus, the first connector and the separator together protect the second electrode plate, preventing burrs of the second electrode plate from impacting the battery cell.

In some embodiments, the tail end of the electrode assembly is located on the first plane surface, and the first connector extends from the first plane surface to the second plane surface through the first cambered surface.

In some embodiments, the tail end of the electrode assembly is a part of the first electrode plate, and a terminating end of the first electrode plate is provided with an uncoated foil zone; or the tail end of the electrode assembly is a part of the separator.

In some embodiments, in the length direction of the battery cell body, the first connector covers a part of the first plane, and a gap is provided between the first connector and any one of the at least two insulators. Thus, the first connector is prevented from overlapping the insulator, increasing the bonding force of the insulator and improving the stability and energy density of the battery cell.

In some embodiments, in the width direction of the battery cell body, a distance d1 between an edge of the battery cell body and the first insulator is greater than or equal to 0.

In some embodiments, in the width direction of the battery cell body, a width d2 of each of the at least two insulators is in a range of 7 mm≤d2≤15 mm.

In some embodiments, in the width direction of the battery cell body, a width d3 of an overlapping region of the first connector and the first insulator is in a range of 2 mm≤d3≤8 mm.

In some embodiments, in the width direction of the battery cell body, a width d4 of a part of the first insulator provided outside the first connector satisfies d4≥3 mm.

An embodiment of this application further provides a battery, including the battery cell.

An embodiment of this application further provides an electronic device, including the battery, where the battery is configured to supply electric energy.

Beneficial effects of the embodiments of this application are as follows:

As compared with the prior art, in the battery cell, the battery, and the electronic device provided in the embodiments of this application, at least part of the insulator closer to the first connector in the at least two insulators is disposed outside the first connector, preventing the insulator from being entirely attached to the first connector, thereby increasing the bonding force of the insulator and improving the stability and energy density of the battery cell.

BRIEF DESCRIPTION OF DRAWINGS

To describe the technical solutions in the embodiments of this application more clearly, the following briefly describes the accompanying drawings for describing the embodiments of this application. Apparently, the accompanying drawings in the following description show merely some embodiments of this application, and persons of ordinary skill in the art may still derive other drawings from these accompanying drawings without creative efforts.

DETAILED DESCRIPTION

For ease of understanding this application, the following further describes this application in detail with reference to the accompanying drawings and specific embodiments. It should be noted that when a component is referred to as being "fixed to" or "connected to" another component, it may be directly fixed to the another component, or there may be one or more components in between. When a component is deemed as being "connected to" another component, it may be directly connected to the another component, or there may be one or more components in between. In the descriptions of this application, the orientations or positional relationships indicated by the terms "end", "lower part", "backward", and the like are based on the orientations or positional relationships shown in the accompanying drawings. Such terms are intended merely for the ease and brevity of description of this application without indicating or implying that the apparatuses or components mentioned in this application must have specified orientations or must be constructed and operated in the specified orientations, and therefore shall not be construed as any limitations on this application. In addition, the terms "first" and "second" are merely intended for a purpose of description, and shall not be understood as an indication or implication of relative importance.

Unless otherwise defined, all technical and scientific terms used herein shall have the same meanings as commonly understood by those skilled in the art to which this application belongs. The terms used in the specification of this application are merely intended to describe specific embodiments but not to constitute any limitations on this application.

In addition, technical features involved in different embodiments of this application that are described below may be combined as long as they do not conflict with each other.

In addition, technical features involved in different embodiments of this application that are described below may be combined as long as they do not conflict with each other.

Figure 1:
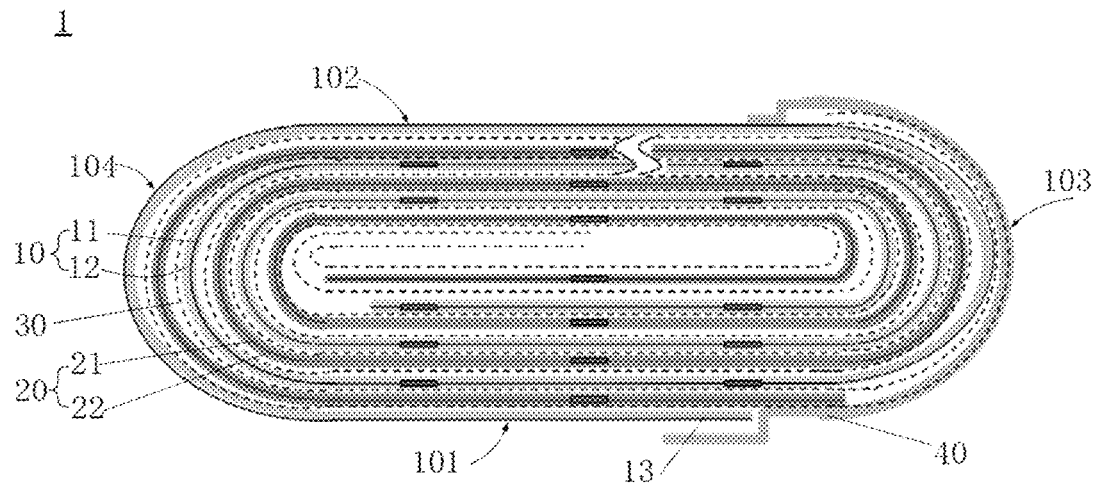
FIG. 1 is a schematic structural diagram of a battery cell according to an embodiment of this application.
Figure 2:
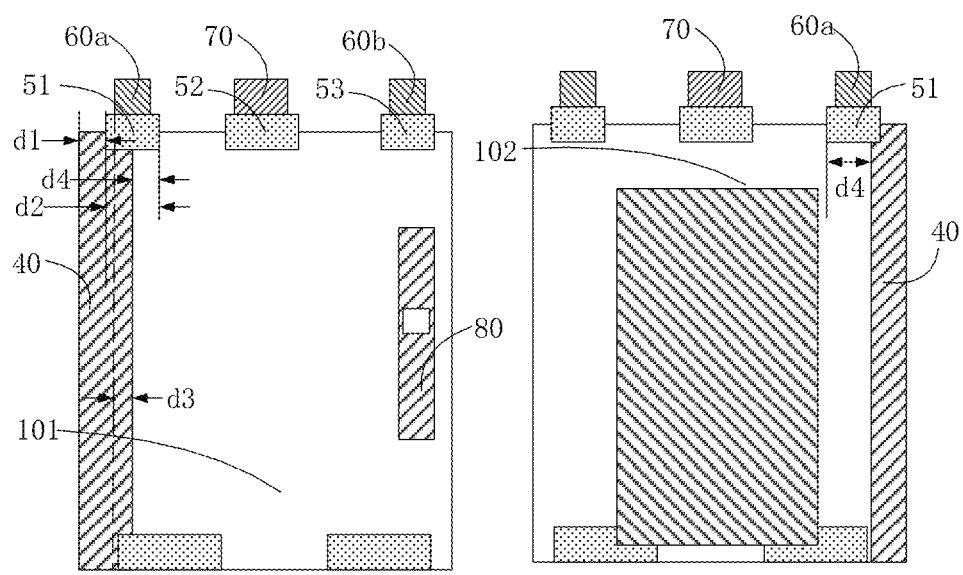
FIG. 2 is a schematic planar diagram of the battery cell in an embodiment of the battery cell shown in FIG. 1, showing a shallow pit surface and a deep pit surface of the battery cell body.

Referring to FIG. 1 and FIG. 2, FIG. 1 is a schematic structural diagram of a battery cell 1 according to an embodiment of this application, and FIG. 2 is a schematic planar diagram of the battery cell 1 on a shallow pit surface and a deep pit surface. The battery cell 1 includes a battery cell body 100 and at least two tabs provided on the battery cell body 100. The battery cell body 100 is formed by winding an electrode assembly formed by stacking a first electrode plate 10 and a second electrode plate 20, and the first electrode plate 10 and the second electrode plate 20 have opposite polarities. A tail end of the electrode assembly is a free end, and a separator 30 is provided between the first electrode plate 10 and the second electrode plate 20. The electrode assembly keeps being wound around a winding needle, from a head end to the tail end of the electrode assembly. After the winding is completed, the winding needle is drawn out of the battery cell body 100.

Further, the battery cell 1 further includes a first connector 40 and at least two insulators 50. The first connector 40 is provided in a length direction of the battery cell body and is configured to fasten the tail end of the electrode assembly to an outer surface of the battery cell body 100. The at least two insulators 50 are provided on the battery cell body and cover the at least two tabs, where in a width direction of the battery cell body, at least a part of the at least two insulators 50 does not overlap with the first connector 40.

It should be noted that the tail end of the electrode assembly refers to a terminating end of the first electrode plate 10, the separator 30, and the second electrode plate 20 that are together wound around the winding needle. To be specific, after the winding is completed, the terminating end on an outermost circle of the battery cell body 100 is fastened to the outer surface of the battery cell body 100 through the first connector 40.

The first electrode plate 10 includes a first current collector 11 and a first active substance layer 12, where the first active substance layer 12 is provided on a surface of the first current collector 11. The second electrode plate 20 includes a second current collector 21 and a second active substance layer 22, where the second active substance layer 22 is provided on a surface of the second current collector 21.

In the embodiment of this application, the first electrode plate 10 is a cathode plate; the first current collector 11 is optionally an aluminum foil layer; and the first active substance layer 12 is a cathode active substance layer, and optionally an electrochemically active substance capable of deintercalating lithium ions, such as $LiCoO_2$ or $LiFePO_4$. The second electrode plate 20 is an anode plate; the second current collector 21 is optionally a copper foil layer; and the second active substance layer 22 is optionally an electrochemically active substance capable of intercalating lithium ions, such as graphite, soft carbon, hard carbon, or $Li_4Ti_5O_{12}$.

It can be understood that the terminating end of the outermost circle of the battery cell body 100 may be the first electrode plate 10, the second electrode plate 20, or the separator 30. For example, in a structure that a terminating end 13 of the first electrode plate 10 is an electrode plate on the outermost circle of the battery cell body 100, the first active substance layer 12 on the terminating end 13 of the first electrode plate 10 covers a side surface of the first current collector 11 facing the second electrode plate 20, and a side surface of the first current collector 11 on the terminating end 13 of the first electrode plate 10 facing away from the second electrode plate 20 is not coated with the first active substance layer 12.

In some embodiments, the outer surface of the battery cell body 100 includes a first plane surface 101, a second plane surface 102, a first cambered surface 103, and a second cambered surface 104, where the first plane surface 101 and the second plane surface 102 are provided opposite to each other in a thickness direction of the battery cell body, the first cambered surface 103 and the second cambered surface 104 are provided opposite to each other in the width direction of the battery cell body, and the first cambered surface 103 and the second cambered surface 104 are connected between the first plane surface 101 and the second plane surface 102.

In some embodiments, the first plane surface 101 is a shallow pit surface, and the second plane surface 102 is a deep pit surface.

The at least two tabs include at least one first tab 60 and at least one second tab 70, where the first tab 60 is connected to the first electrode plate 10, the second tab 70 is connected to the second electrode plate 20, and projections of the first tab 60 and the second tab 70 do not overlap with each other in the thickness direction of the battery cell body.

In the length direction of the battery cell body 100, the first tab 60 and the second tab 70 extend out of a same end of the battery cell body 100. In other embodiments, the first tab 60 and the second tab 70 may extend out of different ends of the battery cell body 100, which is not limited in this application.

In this application, the battery cell 100 including three tabs is used as an example for description. For example, the battery cell 1 includes two first tabs 60 and one second tab 70, and the first tabs 60 and the second tab 70 are arranged alternately. For example, the three tabs are arranged in an order of the first tab 60, the second tab 70, and the first tab 60 in the width direction of the battery cell body 100.

For ease of differentiation, the two first tabs are respectively a first tab 60a and a first tab 60b.

It can be understood that the at least two insulators 50 are in one-to-one correspondence with the tabs in quantity, that is, the number of the at least two insulators 50 is also 3. One end of each of the at least two insulators 50 is provided on the battery cell body 100, and the other end of each of the at least two insulators 50 covers a corresponding tab.

Figure 3:
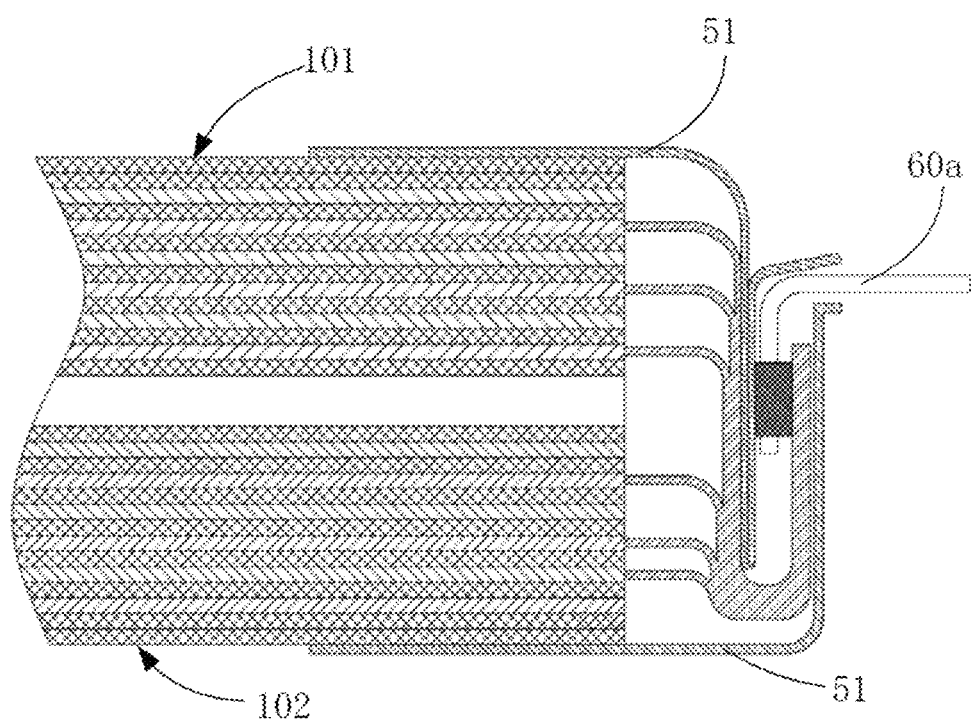
FIG. 3 is a cross-sectional view of a first tab in a thickness direction of the battery cell body in the battery cell shown in FIG. 1.

Specifically, as shown in FIG. 3, the at least two insulators 50 include a first insulator 51, a second insulator 52, and a third insulator 53. For ease of description, an insulator closer to the first connector 40 is the first insulator 51, and a tab closer to the first connector 40 is the first tab 60a. To be specific, a first end of the first insulator 51 is provided on the battery cell body 100, and a second end of the first insulator 51 covers a part of the first tab 60a; a first end of the second insulator 52 is provided on the battery cell body 100, and a second end of the second insulator 52 covers part of the second tab 70; and a first end of the third insulator 53 is provided on the battery cell body 100, and a second end of the third insulator 53 covers a part of the first tab 60b. In the width direction of the battery cell body 100, at least a part of the first insulator 51 does not overlap with the first connector 40.

In some embodiments, for ease tracing of the battery cell 1, an identification code is generally set on the first plane surface 101.

Figure 4:
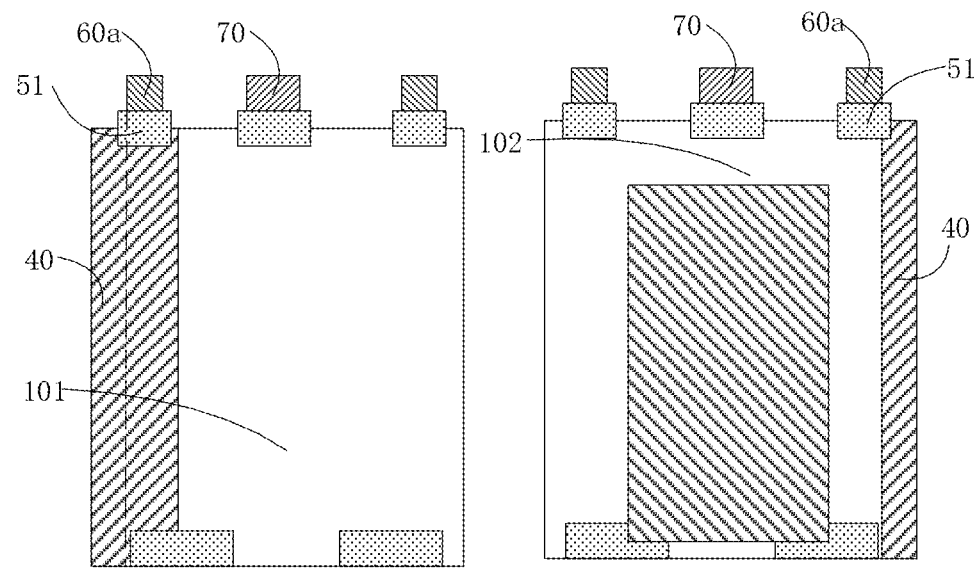
FIG. 4 is a schematic planar diagram of a battery cell in the prior art.

In the prior art, when the electrode assembly is wound to form the battery cell body 100, the tail end of the electrode assembly is usually located on a side portion of the battery cell body 100, and in fastening a tail of the electrode assembly, the first connector 40 needs to extend from the first plane surface 101 of the battery cell body 100 to the second plane surface 102 of the battery cell body 100, as shown in FIG. 4. However, when a tab (the tab closer to the first connector 40) has a small edge distance, the insulator on the tab is entirely attached to the first connector 40, leading to insufficient bonding force of the insulator (the first connector 40 is usually a single-sided adhesive, meaning that a surface of the first connector 40 in contact with the first electrode plate 10 and/or the second electrode plate 20 is provided with a binding layer) and upwarp of the insulator when the battery cell 1 is top-sealed. In addition, the insulator being entirely attached to the first connector 40 leads to more overlapping regions of the insulator and the first connector 40, affecting the energy density of the battery cell 1.

In view of this, in this application, at least a part of the first insulator 51 does not overlap with the first connector 40, so as to prevent the insulator from being entirely attached to the first connector 40, thereby improving the stability and energy density of the battery cell 1.

It should be noted that the side portion of the battery cell body 100 refers to a portion of an edge close to the length direction of the battery cell body 100, when viewed along the thickness direction of the battery cell body 100, that is, the first cambered surface 103 or the second cambered surface 104 on the outer surface of the battery cell body 100.

It can be understood that the tail end of the electrode assembly may be located on the side portion of the battery cell body 100, or may be located on the first plane surface 101 or second plane surface 102 of the battery cell body.

It should be noted that when the tail end of the electrode assembly is located on the side portion of the battery cell body 100, and a terminating end of a single-sided cathode plate (a side of the terminating end of the cathode plate facing the anode plate is coated with a cathode active substance, and a side facing away from the anode plate is coated with no cathode active substance) is located on the outermost circle of the battery cell body 100, the first connector 40 covers the entire second electrode plate 20 in the length direction of the battery cell body 100. In other words, in the length direction of the battery cell body 100, the first connector 40 needs to be longer than the second electrode plate 20, so as to avoid damage caused by burrs on the second electrode plate 20. When the tail end of the electrode assembly is located on the first plane surface 101 or the second plane surface 102 of the battery cell body 100, the first connector 40 is only required to cover a part of the first plane surface 101 or the second plane surface 102 in the length direction of the battery cell body 100.

In some embodiments, the tail end of the electrode assembly is located on the side portion of the battery cell body 100, and the first insulator 51 partially overlaps with the first connector 40, as shown in FIG. 2. Specifically, in the width direction of the battery cell body 100, a portion of the first insulator 51 is provided on the first connector 40, and another portion of the first insulator 51 is provided on the first plane surface 101 and/or the second plane surface 102. As compared with the prior art, the width of the first connector 40 decreases in the width direction of the battery cell body 100. If the identification code needs to be set on the first plane surface 101, the identification code is attached to the first plane surface 101 independently. For example, the battery cell 1 further includes a second connector 80, the second connector 80 is provided on the first plane surface 101 and spaced apart from the first connector 40, and the identification code is set on the second connector 80.

In this case, in the width direction of the battery cell body 100, a distance d1 between the first insulator 40 and an edge of the battery cell body 100 is greater than or equal to 0.

In some embodiments, in the width direction of the battery cell body 100, a width d2 of the first insulator is in a range of 7 mm≤d2≤15 mm.

It can be understood that a width of the second insulator 52 and a width of the third insulator 53 also need to satisfy the foregoing condition.

In some embodiments, in the width direction of the battery cell body 100, a width d3 of the first tab 60a on the first connector 40 is in a range of 2 mm≤d3≤8 mm.

In some embodiments, in the width direction of the battery cell body 100, a portion of the first insulator 51 provided outside the first connector 40 has a width d4 satisfying d4≥3 mm, that is, the width d4 of a non-overlapping region of the first insulator 51 and the first connector 40 satisfies d4≥3 mm.

In some embodiments, in the length direction of the battery cell body 100, a height of a portion of the insulator provided on the battery cell body is greater than or equal to 3 mm.

Figure 5:
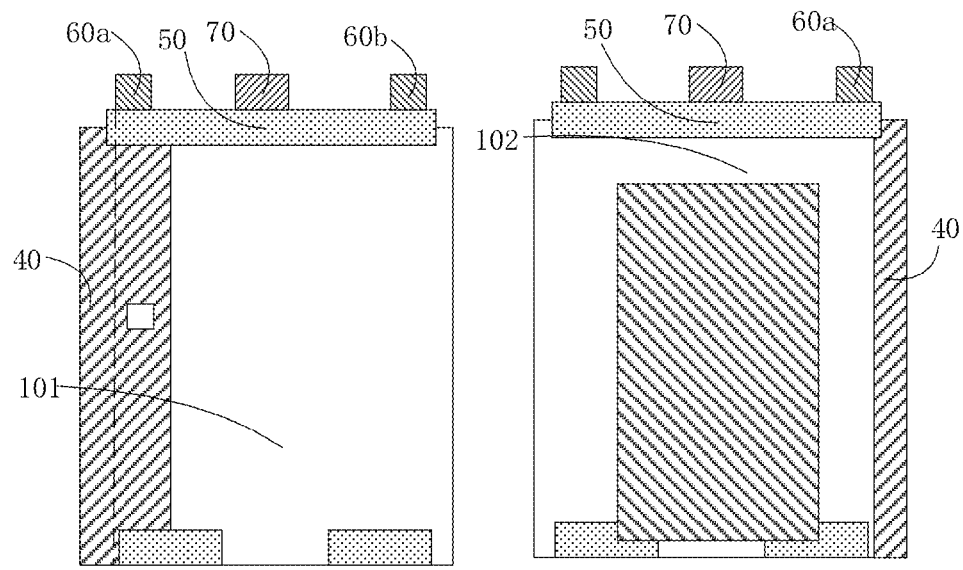
FIG. 5 is a schematic planar diagram of the battery cell in an embodiment of the battery cell shown in FIG. 1, showing the first, second, and third insulators integrally formed.

In some embodiments, the at least two insulators 50 are integrally formed. That is, as shown in FIG. 5, the first insulator 51, the second insulator 52, and the third insulator 53 are integrally formed to increase a binding area of the insulator and the battery cell body 100. Therefore, there is no need to worry that when the first insulator 51 is entirely attached to the first connector 40, the first insulator 51 tends to upwarp during top sealing of battery cell 1 while such upwarp will cause instability of the battery cell 1. In this case, the first connector 40 does not need to be narrowed, and the identification code can be etched on the first connector 40 without adding the second connector 80 separately.

Figure 6:
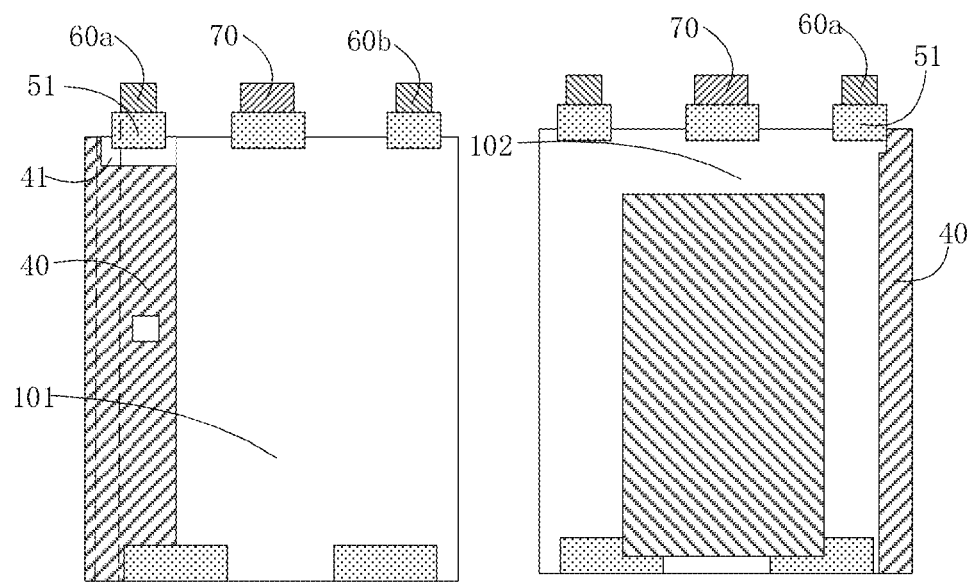
FIG. 6 is a schematic planar diagram of the battery cell in an embodiment of the battery cell shown in FIG. 1, showing that in the width direction of the battery cell body, the first insulator is entirely outside the first connector.

In some embodiments, as shown in FIG. 6, in the width direction of the battery cell body 100, the first insulator 51 is entirely outside the first connector 40. For example, a gap is provided between the first insulator 51 and the first connector 40. Specifically, the first connector 40 is provided with a notch 41 in the length direction of the battery cell body 100, and a portion of the first insulator 51 provided on the battery cell body 100 is arranged in the notch 41.

It should be noted that, when the tail end of the electrode assembly is provided on the side portion of the battery cell body 100 and the cathode plate is on the outermost circle of the battery cell body 100, the notch needs to be big enough to allow the first connector 40 to cover the entire anode plate in the length direction of the battery cell body 100, so that the first connector 40 and the separator 30 can together protect the anode plate, preventing burrs on the anode plate from damaging the battery cell 1.

Figure 7:
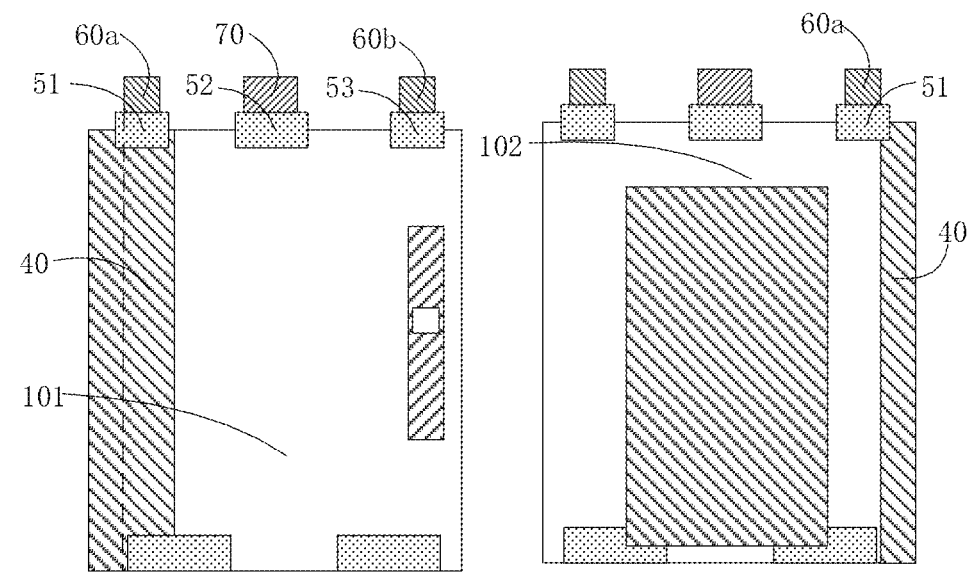
FIG. 7 is a schematic planar diagram of the battery cell in an embodiment of the battery cell shown in FIG. 1, showing that when both opposite surfaces of the first connector in the thickness direction of the battery cell body are provided with binding layers, the first, second, and third insulators are formed individually.

In some embodiments, to ensure the bonding force of the first insulator 51, both two opposite surfaces of the first connector 40 in the thickness direction of the battery cell body 100 are provided with binding layers, as shown in FIG. 7. In this case, the first insulator 51 can be entirely attached to the first connector 40 without causing upwarp of the first insulator 51 during top sealing of the battery cell 1.

Figure 8:
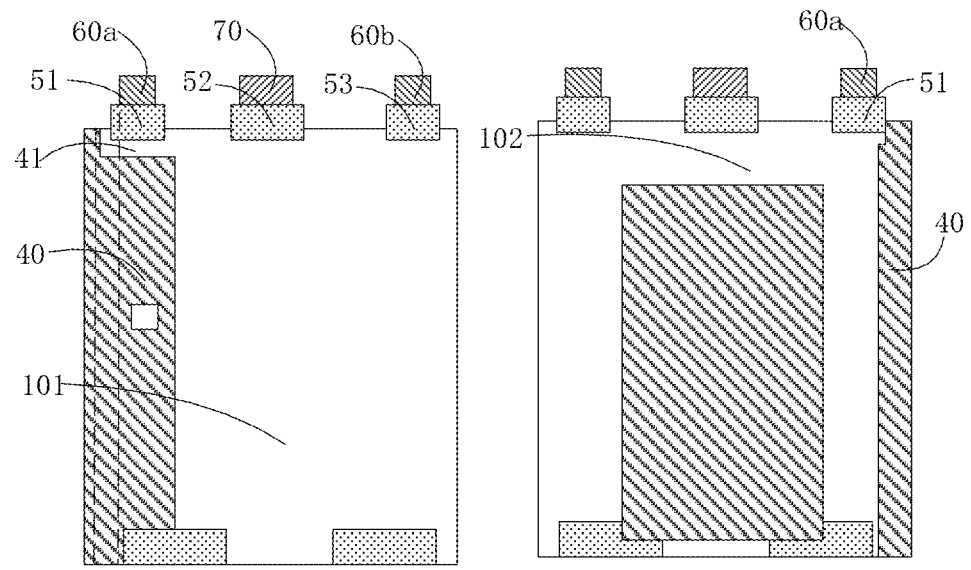
FIG. 8 is a schematic planar diagram of the battery cell in an embodiment of the battery cell shown in FIG. 1, showing that the first connector is provided with a notch.
Figure 9:
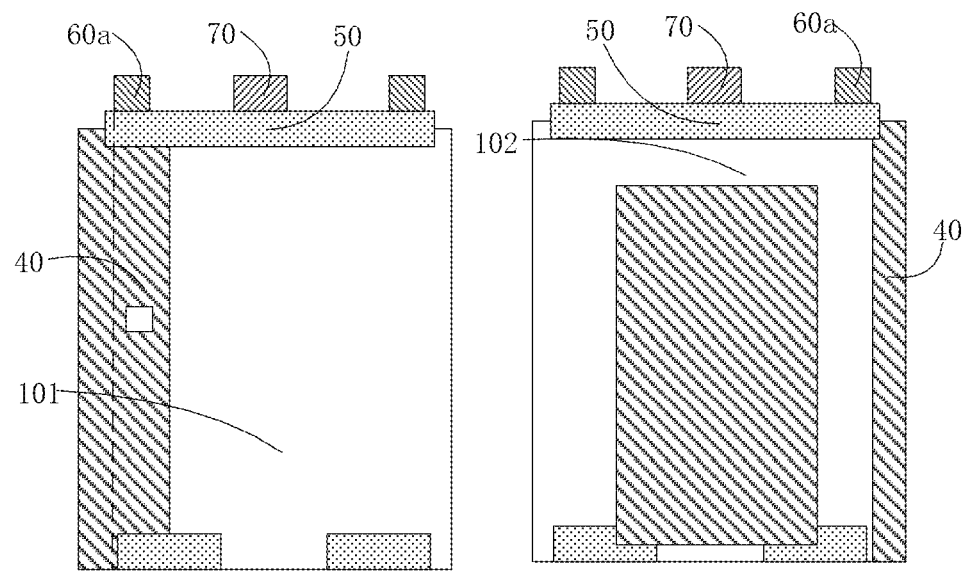
FIG. 9 is a schematic planar diagram of the battery cell in an embodiment of the battery cell shown in FIG. 1, showing that when both opposite surfaces of the first connector in the thickness direction of the battery cell body are provided with binding layers, the first, second, and third insulators are integrally formed.

It can be understood that, when both two opposite surfaces of the first connector 40 in the thickness direction of the battery cell body 100 are provided with binding layers, the first insulator 51, the second insulator 52, and the third insulator 53 can be formed individually, as shown in FIG. 7. Alternatively, the first insulator 51, the second insulator 52, and the third insulator 53 may be integrally formed, as shown in FIG. 9. Alternatively, the first connector 40 may be provided with the notch 41, as shown in FIG. 8. The identification code may be set on the first connector 40 or the second connector 80 according to actual situations.

Figure 10:
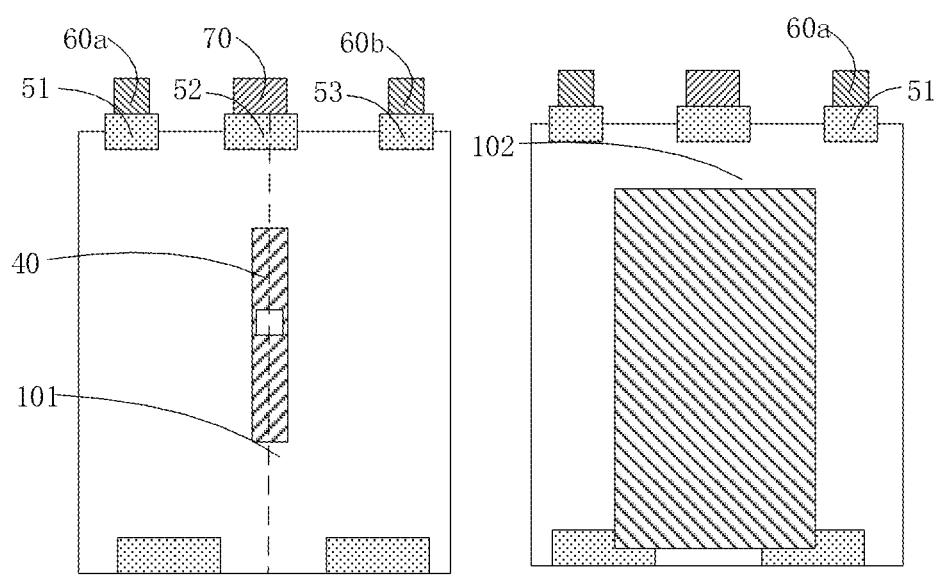
FIG. 10 is a schematic planar diagram of the battery cell in an embodiment of the battery cell shown in FIG. 1, showing the first connector covering only part of the first or second plane surface, with a gap between the first connector and any one of the at least two insulators in the length direction of the battery cell body.

In some embodiments, the outermost circle of the battery cell body 100 is the first electrode plate 10, the terminating end 13 of a part of the first electrode plate 10 includes an uncoated foil zone with neither side coated with the first active substance layer 12, and the terminating end 13 of the part of the first electrode plate 10 (the tail end of the electrode assembly) is provided on the first plane surface 101 or the second plane surface 102 of the battery cell body 100, as shown in FIG. 10. In this embodiment, in the length direction of the battery cell body 100, the first connector 40 can cover only a part of the first plane surface 101 or the second plane surface 102, provided that a gap is provided between the first connector 40 and any one of the at least two insulators 50 in the length direction of the battery cell body 100. In this way, the first connector 40 can be fully prevented from overlapping the insulator. In this case, the identification code may be etched on the first connector 40.

It can be understood that the foregoing embodiments are also applicable to a case that the outermost circle of the battery cell body 100 is a part of the separator 30, and details are not described herein again.

An embodiment of this application further provides a battery, including the battery cell 1.

An embodiment of this application further provides an electronic device, including the battery.

The electronic device may be an electric vehicle, a sweeping robot, a mobile phone, a tablet computer, or the like.

As compared with the prior art, in the battery cell 1, the battery, and the electronic device provided in the embodiments of this application, at least two insulators 50 does not overlap with the first connector 40. This prevents the insulator from being entirely attached to the first connector 40, thereby increasing the bonding force of the insulator and improving the stability and energy density of the battery cell 1.

Finally, it should be noted that the foregoing embodiments are merely intended to describe the technical solutions of this application, and are not intended to limit this application. Under the idea of this application, the foregoing embodiments or the technical features in different embodiments can also be combined, the steps can be implemented in any order, and there are many other changes in different aspects of this application as described above, which, for the sake of brevity, are not provided in detail. Although this application is described in detail with reference to the foregoing embodiments, persons of ordinary skill in the art should understand that modifications can be made to the technical solutions described in the foregoing embodiments, or equivalent substitutions can be made to some technical features therein, and these modifications or substitutions do not make the essence of the corresponding technical solutions depart from the scope of the technical solutions of the embodiments of this application.

The invention claimed is:

1. A battery cell, comprising a battery cell body and a tab provided on the battery cell body; the battery cell body comprises an electrode assembly, the electrode assembly is a winding structure, and the electrode assembly comprises a first electrode plate and a second electrode plate; a tail end of the electrode assembly is a free end; a separator is provided between the first electrode plate and the second electrode plate; the battery cell further comprises a first connector and an insulator; wherein,
  the first connector is provided in an extension direction of the tab;
  the first connector fastens the tail end of the electrode assembly to an outer surface of the battery cell body;
  the tab comprises a first tab connected to the first electrode plate and a second tab connected to the second electrode plate;
  the first tab and the second tab have opposite polarities;
  the insulator comprises a first insulator and a second insulator;
  a first end of the first insulator is provided on the battery cell body;
  a second end of the first insulator covers a part of the first tab;
  a first end of the second insulator is provided on the battery cell body;
  a second end of the second insulator covers a part of the second tab;
  in a direction perpendicular to the extension direction of the tab, a distance between the first connector and the first insulator is less than a distance between the first connector and the second insulator; and
  viewed along a thickness direction of the battery cell body, at least a part of the first insulator does not overlap with the first connector in the direction perpendicular to the extension direction of the tab.

2. The battery cell according to claim 1, wherein, a surface of the first connector in contact with the battery cell body is provided with a binding layer.

3. The battery cell according to claim 1, wherein, both two opposite surfaces of the first connector in the thickness direction of the battery cell body are provided with binding layers.

4. The battery cell according to claim 3, wherein, in the direction perpendicular to the extension direction of the tab, an other part of the first insulator overlaps with the first connector.

5. The battery cell according to claim 2, wherein, in the direction perpendicular to the extension direction of the tab, the first insulator partially overlaps with the first connector.

6. The battery cell according to claim 2, wherein, a gap is provided between the first insulator and the first connector.

7. The battery cell according to claim 6, wherein,
  the first connector is provided with a notch in the extension direction of the tab; and
  a portion of the first insulator provided on the battery cell body is arranged in the notch.

8. The battery cell according to claim 1, wherein,
  the battery cell further comprises a third tab;
  the third tab has a same polarity as the first tab;
  the insulator further comprises a third insulator;
  a first end of the third insulator is provided on the battery cell body;
  a second end of the third insulator covers a part of the third tab; and
  the second tab is provided between the first tab and the third tab in the direction perpendicular to the extension direction of the tab.

9. The battery cell according to claim 8, wherein, the first insulator, the second insulator, and the third insulator are integrally formed to each other.

10. The battery cell according to claim 8, wherein,
the outer surface of the battery cell body comprises a first plane surface, a second plane surface, a first cambered surface, and a second cambered surface;
the first plane surface and the second plane surface are provided opposite to each other in the thickness direction of the battery cell body;
the first cambered surface and the second cambered surface are provided opposite to each other in the direction perpendicular to the extension direction of the tab; and
the first cambered surface and the second cambered surface are connected between the first plane surface and the second plane surface.

11. The battery cell according to claim 10, wherein,
the tail end of the electrode assembly is located on the first cambered surface; and
the first connector extends from the first plane surface to the second plane surface through the first cambered surface.

12. The battery cell according to claim 10, wherein,
the tail end of the electrode assembly is located on the first plane surface; and
the first connector extends from the first plane surface to the second plane surface through the first cambered surface.

13. The battery cell according to claim 11, wherein,
the tail end of the electrode assembly is a part of the first electrode plate or a part of the separator; and
the first connector covers the entire second electrode plate in the extension direction of the tab.

14. The battery cell according to claim 12, wherein,
the tail end of the electrode assembly is a part of the first electrode plate, and
a terminating end of the first electrode plate is provided with an uncoated foil zone; or
the tail end of the electrode assembly is a part of the separator.

15. The battery cell according to claim 14, wherein, in the extension direction of the tab, a gap is provided between the first connector and each insulator.

16. The battery cell according to claim 8, wherein, in the direction perpendicular to the extension direction of the tab, a distance d1 between an edge of the battery cell body and the first insulator is greater than or equal to 0.

17. The battery cell according to claim 8, wherein, in the direction perpendicular to the extension direction of the tab, a width d2 of each insulator is in a range of 7 mm≤d2≤15 mm.

18. The battery cell according to claim 5, wherein, in the direction perpendicular to the extension direction of the tab, a width d3 of an overlapping region of the first connector and the first insulator is in a range of 2 mm≤d3≤8 mm.

19. The battery cell according to claim 5, wherein, in the direction perpendicular to the extension direction of the tab, a width d4 of a part of the first insulator provided outside the first connector satisfies d4≥3 mm.

20. A battery, comprising a battery cell; the battery cell comprises a battery cell body and a tab provided on the battery cell body; the battery cell body comprises an electrode assembly, the electrode assembly is a winding structure, and the electrode assembly comprises a first electrode plate and a second electrode plate; a tail end of the electrode assembly is a free end; a separator is provided between the first electrode plate and the second electrode plate; the battery cell further comprises a first connector and an insulator; wherein,
the first connector is provided in an extension direction of the tab;
the first connector fastens the tail end of the electrode assembly to an outer surface of the battery cell body;
the tab comprises a first tab connected to the first electrode plate and a second tab connected to the second electrode plate;
the first tab and the second tab have opposite polarities;
the insulator comprises a first insulator and a second insulator;
a first end of the first insulator is provided on the battery cell body;
a second end of the first insulator covers a part of the first tab;
a first end of the second insulator is provided on the battery cell body;
a second end of the second insulator covers a part of the second tab;
in a direction perpendicular to the extension direction of the tab, a distance between the first connector and the first insulator is less than a distance between the first connector and the second insulator; and
viewed along a thickness direction of the battery cell body, at least a part of the first insulator does not overlap with the first connector in the direction perpendicular to the extension direction of the tab.

21. An electronic device, comprising a battery; the battery is configured to supply electric energy; the battery comprises a battery cell; the battery cell comprises a battery cell body and a tab provided on the battery cell body; the battery cell body comprises an electrode assembly, the electrode assembly is a winding structure, and the electrode assembly comprises a first electrode plate and a second electrode plate; a tail end of the electrode assembly is a free end; a separator is provided between the first electrode plate and the second electrode plate; the battery cell further comprises a first connector and an insulator; wherein,
the first connector is provided in an extension direction of the tab;
the first connector fastens the tail end of the electrode assembly to an outer surface of the battery cell body;
the tab comprises a first tab connected to the first electrode plate and a second tab connected to the second electrode plate;
the first tab and the second tab have opposite polarities;
the insulator comprises a first insulator and a second insulator;
a first end of the first insulator is provided on the battery cell body;
a second end of the first insulator covers a part of the first tab;
a first end of the second insulator is provided on the battery cell body;
a second end of the second insulator covers a part of the second tab;
in a direction perpendicular to the extension direction of the tab, a distance between the first connector and the first insulator is less than a distance between the first connector and the second insulator; and
viewed along a thickness direction of the battery cell body, at least a part of the first insulator does not overlap with the first connector in the direction perpendicular to the extension direction of the tab.

22. A battery cell, comprising a battery cell body and a tab provided on the battery cell body; the battery cell body comprises an electrode assembly, the electrode assembly is a winding structure, and the electrode assembly comprises a first electrode plate and a second electrode plate; a tail end of the electrode assembly is a free end; a separator is provided between the first electrode plate and the second electrode plate; the battery cell further comprises a first connector and an insulator; wherein, the first connector is provided in an extension direction of the tab;

the first connector fastens the tail end of the electrode assembly to an outer surface of the battery cell body;

the tab comprises a first tab connected to the first electrode plate and a second tab connected to the second electrode plate;

the first tab and the second tab have opposite polarities;

the insulator comprises a first insulator and a second insulator;

a first end of the first insulator is provided on the battery cell body;

a second end of the first insulator covers a part of the first tab;

a first end of the second insulator is provided on the battery cell body;

a second end of the second insulator covers a part of the second tab;

in a direction perpendicular to the extension direction of the tab, a distance between the first connector and the first insulator is less than a distance between the first connector and the second insulator;

both two opposite surfaces of the first connector in a thickness direction of the battery cell body are provided with binding layers; and viewed along a thickness direction of the battery cell body, the first insulator completely overlaps with the first connector in the direction perpendicular to the extension direction of the tab.

* * * * *